US012807434B2

(12) United States Patent
Kögel

(10) Patent No.: US 12,807,434 B2
(45) Date of Patent: Nov. 24, 2026

(54) RECEIVING DEVICE FOR TRANSPORTING OBJECTS AND COMBINATION OF SUCH A RECEIVING DEVICE WITH AN AUXILIARY DEVICE

(71) Applicant: SOMIC VERPACKUNGSMASCHINEN GMBH & CO. KG, Amerang (DE)

(72) Inventor: Christoph Kögel, Prutting (DE)

(73) Assignee: SOMIC VERPACKUNGSMASCHINEN GMBH & CO. KG, Amerang (DE)

( * ) Notice: Subject to any disclaimer, the term of this patent is extended or adjusted under 35 U.S.C. 154(b) by 262 days.

(21) Appl. No.: 18/650,588

(22) Filed: Apr. 30, 2024

(65) Prior Publication Data

US 2024/0367926 A1 Nov. 7, 2024

(30) Foreign Application Priority Data

May 4, 2023 (EP) .................................... 23171557

(51) Int. Cl.
*B65G 65/23* (2006.01)

(52) U.S. Cl.
CPC .................................... *B65G 65/23* (2013.01)

(58) Field of Classification Search
CPC ......... A47J 37/1219; B65G 2201/0258; B65G 65/23; B65G 47/962; B65G 2207/46;
(Continued)

(56) References Cited

U.S. PATENT DOCUMENTS 11,700,966 B1 * 7/2023 Bourgeois ............... A47J 37/12 99/410
2008/0271971 A1 11/2008 Schuck et al.
(Continued)

FOREIGN PATENT DOCUMENTS

CH 710851 A1 9/2016
CN 112919319 A * 6/2021 ............... B66C 1/10
(Continued)

OTHER PUBLICATIONS

European Application No. 23171557.4 , "Extended European Search Report", Oct. 24, 2023, 6 pages.
(Continued)

*Primary Examiner* — Kaitlin S Joerger
(74) *Attorney, Agent, or Firm* — Kilpatrick Townsend & Stockton LLP

(57) ABSTRACT

The invention relates to a receiving device for transporting objects, wherein the receiving device comprises a base unit with a floor portion and two wall portions. According to the invention, the receiving device further comprises a tilting unit which is hinged to the base unit by means of a tilting hinge so as to be tiltable about a tilting axis between a horizontal tilting position and a vertical tilting position, wherein the tilting unit comprises a support portion which, in the horizontal position, extends substantially parallel to the floor portion of the base unit, and two retaining portions which, regardless of the respective tilting position, extend substantially orthogonally to the wall portions of the base unit. The invention further relates to a combination of such a receiving device with an auxiliary device, which is preferably configured as a removal device.

13 Claims, 2 Drawing Sheets

Figure 1:
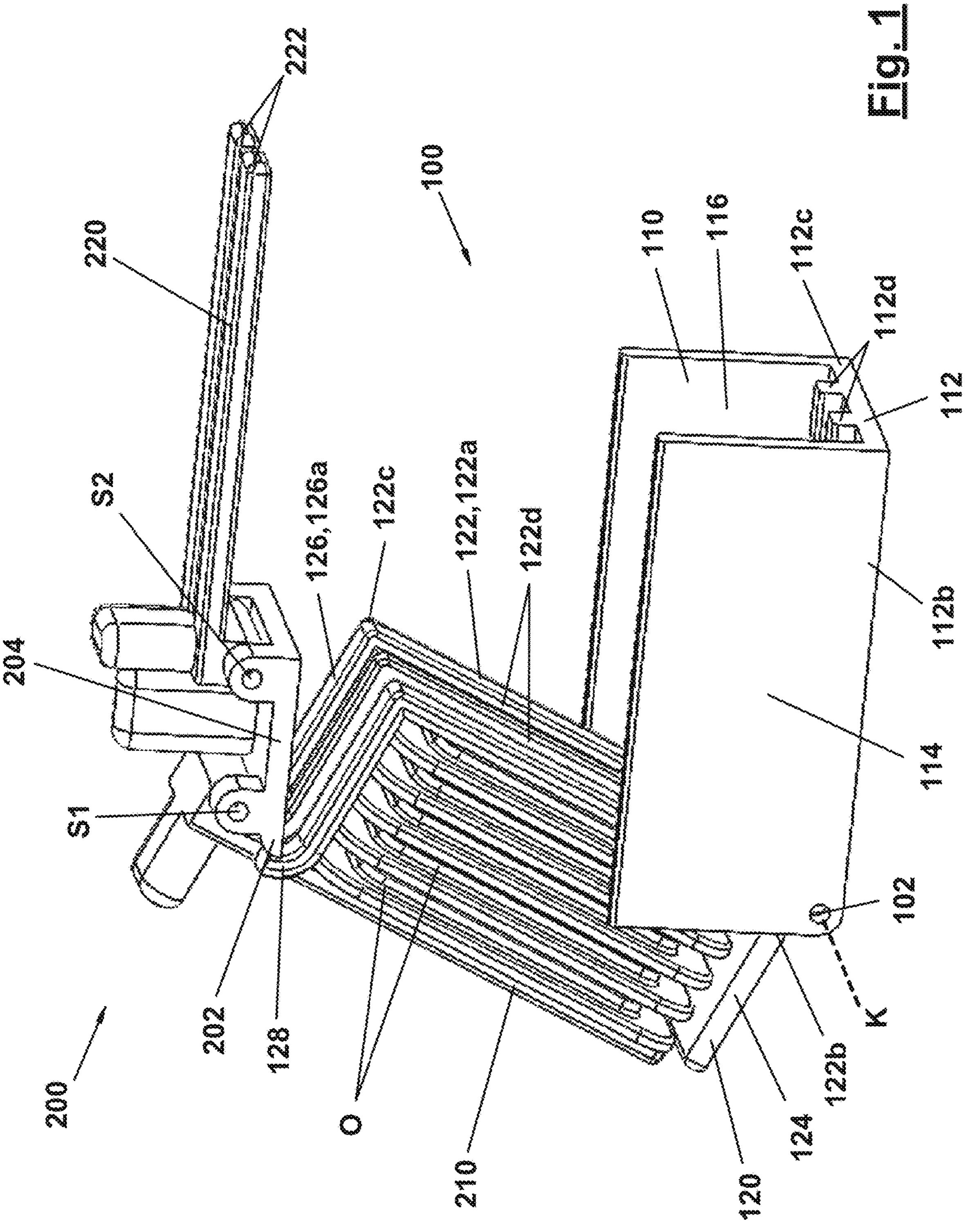

(58) Field of Classification Search
CPC ................ B65H 31/3045; B65H 31/30; B65H 2301/4225; B65H 2301/42254
USPC .......................................................... 414/790
See application file for complete search history.

(56) References Cited

U.S. PATENT DOCUMENTS

| | | | | |
|---|---|---|---|---|
| 2011/0151074 | A1* | 6/2011 | Titen | A47J 37/1219 426/233 |
| 2017/0164787 | A1* | 6/2017 | Freret | A47J 37/0704 |
| 2019/0029468 | A1* | 1/2019 | Bourgeois | A23L 13/50 |
| 2020/0030995 | A1 | 1/2020 | Lu et al. | |
| 2020/0048019 | A1* | 2/2020 | Werner | B65G 17/002 |
| 2024/0043230 | A1* | 2/2024 | Troiano | B65G 47/904 |
| 2024/0423414 | A1* | 12/2024 | Reichelderfer | A47J 37/1295 |

FOREIGN PATENT DOCUMENTS

| | | | | |
|---|---|---|---|---|
| DE | 19835233 | A1 | 2/2000 | |
| DE | 102020121883 | A1 | 2/2022 | |
| EP | 3608264 | A1 | 2/2020 | |
| WO | WO-2022038049 | A1 * | 2/2022 | B60P 1/04 |
| WO | 2024002473 | A1 | 1/2024 | |

OTHER PUBLICATIONS

European Application No. 23171557.4, Office Action mailed Sep. 1, 2026, 7 pages.

* cited by examiner

RECEIVING DEVICE FOR TRANSPORTING OBJECTS AND COMBINATION OF SUCH A RECEIVING DEVICE WITH AN AUXILIARY DEVICE

CROSS REFERENCE TO RELATED APPLICATION

This application claims priority to European Patent Application No. 23171557.4, filed in Europe on May 4, 2023, the entire contents of which are hereby incorporated herein by this reference.

The invention relates to a receiving device for transporting at least one object not belonging to the receiving device, the receiving device comprising a base unit with a floor portion, the underside of which is prepared for attachment to a mover, not belonging to the receiving device, of a conveying device also not belonging to the receiving device, and two wall portions which project from two side edges of the floor portion lying opposite one another starting from a side of the floor portion facing away from the underside of the floor portion.

From the applicant's international patent application PCT/EP2022/067894, not yet published at the time of filing the present application, it is known that a receptacle suitable for loading with at least one object can be attached to a mover of a device designed using magnetic levitation technology. However, PCT/EP2022/067894 does not specify how the at least one object can be removed from the receptacle.

From the applicant's European patent application No. 25 153 079.1, not yet published at the time of filing the present application, a connecting arrangement for fastening a receiving device on a mover is known.

US 2020/0030995 A1 generally describes a device designed using magnetic levitation technology.

The task of the invention is to provide a receiving device which can be unloaded in a simple manner and which also allows vertical unloading of objects placed horizontally in the receiving device.

According to the invention, this task is solved by a receiving device of the type mentioned above, which further comprises a tilting unit which is hinged to the base unit by means of a tilting hinge so as to be tiltable about a tilting axis between a horizontal tilting position and a vertical tilting position, which axis extends substantially orthogonally to the wall portions of the base unit, the tilting unit comprising a support portion which, in the horizontal position, extends substantially parallel to the floor portion of the base unit, and two retaining portions which, regardless of the respective tilting position, extend substantially orthogonally to the wall portions of the base unit. When the tilting unit is in its horizontal tilting position it forms, together with the base unit, an upwardly open tray-shaped receptacle into which the objects to be transported can be placed horizontally and stacked on top of one another. The tilting unit can be transferred to its vertical tilting position in order to unload the receiving device. The objects are thereby set upright and can be picked up by a gripper and removed from the receiving device.

To transfer the tilting unit from the horizontal tilting position to the vertical tilting position in a simple manner, it is proposed that an engagement element be provided at a free end of the retaining portion arranged at a distance from the tilting axis. A counter-engagement element of an auxiliary device not belonging to the receiving device is able to engage with this engagement element, so that the tilting unit can be transferred from the horizontal tilting position to the vertical tilting position by moving the auxiliary device and the receiving device relative to one another.

In order to prevent objects from falling out of the tilting unit when the tilting unit is in the vertical tilting position, the auxiliary device can comprise an abutting unit which is pivotably hinged to the auxiliary device about a pivot axis and is designed and intended, after the engagement element of the receiving device and the counter-engagement element of the auxiliary device have engaged with one another, to abut from above against the object or stack of objects received in the receiving device, and to continue to abut in this way during the tilting of the tilting unit by pivoting about the pivot axis in a manner adapted to the tilt.

In order to be able also to abut against the object or object stack from the rear, it is proposed in a further development of the invention that the tilting unit has at least one aperture, preferably at least two apertures, passing from a free end of the retaining portion arranged at a distance from the tilting axis and extending into the support portion, preferably up to an end of the support portion adjacent to the tilting axis. A further abutting unit of the auxiliary device can move through this at least one aperture and abut against the object or object stack.

Through the interaction of the two abutting units, the auxiliary device can perform the function of a removal device which grips the object or object stack by means of the two abutting units and moves it out of the tilting unit.

In order to return the tilting unit to the horizontal tilting position, a return spring, for example a torsion spring, or a pneumatic and/or electric motor-driven power unit can be assigned to the tilting hinge. In principle, however, the tilting unit can also be returned to the horizontal tilting position manually.

To fully support the object or the lowest object of an object stack when the tilting unit is in the horizontal tilting position, it is proposed that the floor portion of the base unit has a support rib at a point corresponding to the at least one aperture in the tilting unit, which rib substantially fills the at least one aperture when the tilting unit is in the horizontal tilting position.

According to a further aspect, the invention further relates to a combination of a receiving device and an auxiliary device. Concerning the advantages that can be achieved with this combination, see the above explanation of the holding device and its interaction with the auxiliary device.

The invention is explained in more detail below based on exemplary embodiments with reference to the accompanying drawings. These show the following:

FIG. 1 A perspective view of a receiving device according to the invention interacting with an auxiliary device configured as a removal device; and FIGS. 2 to 5 Schematic representations illustrating the process of unloading the receiving device according to the invention using the removal device.

In FIG. 1, a receiving device according to the invention is generally designated with the reference number 100 and an auxiliary device according to the invention is generally designated with the reference number 200.

Figure 4:
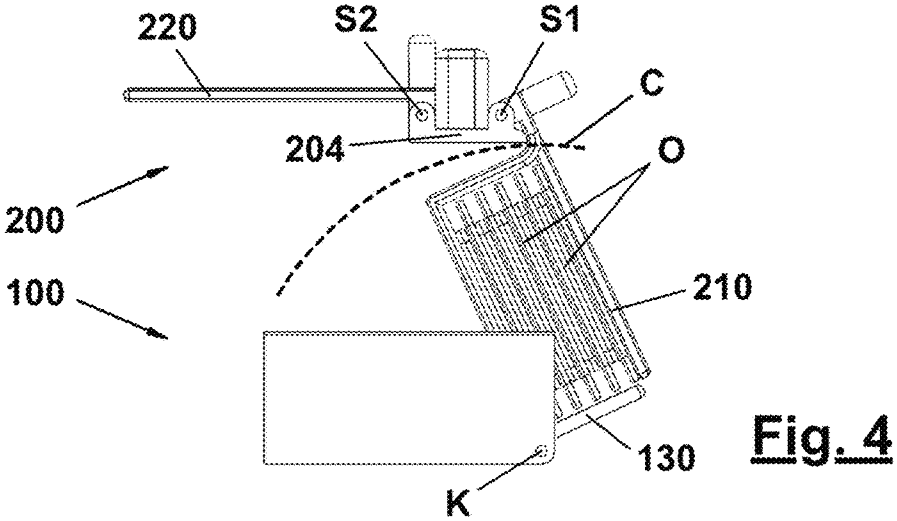
Figure 5:
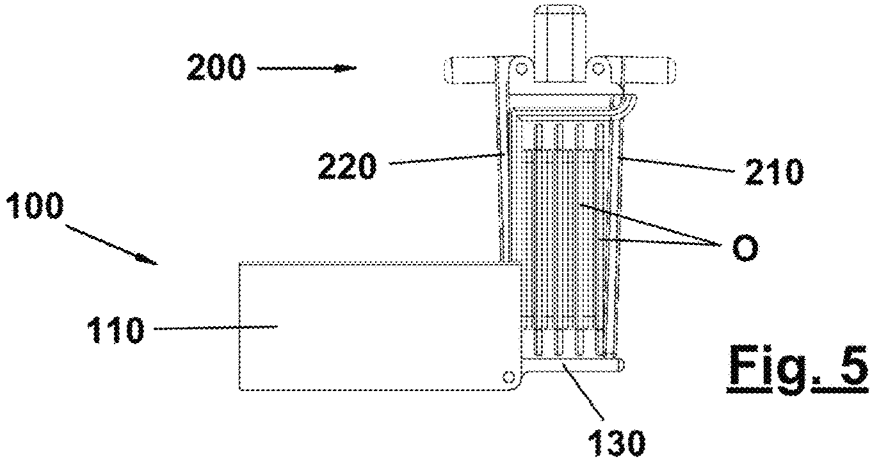

The receiving device 100 comprises a base unit 110 and a tilting unit 120 which is hinged to the base unit 110 by means of a tilting hinge 102 so as to be tiltable about a tilting axis K between a horizontal tilting position (see FIGS. 2 and 3) and a vertical tilting position (see FIG. 5). In FIG. 1, the tilting unit 120 is shown in an intermediate tilting position (see also FIG. 4).

The base unit 110 comprises a floor portion 112, which is substantially rectangular in the exemplary embodiment shown. An underside 112*a* of the floor portion is prepared for connection to a mover M (see FIG. 2) of a conveying device F designed for example using magnetic levitation technology, whereby the receiving device 100 can be moved along a working surface A of the conveying device F in order to transport objects O (see FIG. 1) from a predefined pick-up position to a predefined delivery position.

The base unit 110 further comprises two wall portions 114, 116 which project upwards from two longitudinal edges 112*b*, 112*c* of the floor portion of the base unit 110.

The tilting unit 120 comprises a support portion 122, which, as will be explained in more detail below, is formed by three support struts 122*a* in the exemplary embodiment shown, as well as two retaining portions 124, 126, which project upwards from the two short sides 122*b*, 122*c* of the support portion 122. While the retaining portion 124, which is arranged on the side of the support portion 122 facing the tilting hinge 102, forms a continuous surface, the opposite retaining portion 126 is formed by three retaining struts 126*a*, which are formed in one piece with the support struts 122*a* but extend substantially orthogonally thereto.

In its horizontal tilting position, the tilting unit 120 together with the base unit 110 forms an upwardly open tray into which objects O can be placed.

At this point, it should also be noted that the floor portion 112 of the base unit 110 has two support strips 112*d* which, when the tilting unit 120 is in the horizontal tilting position, engage in the apertures 122*d* between the support struts 122*a* and thus, together with the support struts 122*a*, form a substantially continuous support surface for the objects O.

Figure 2:
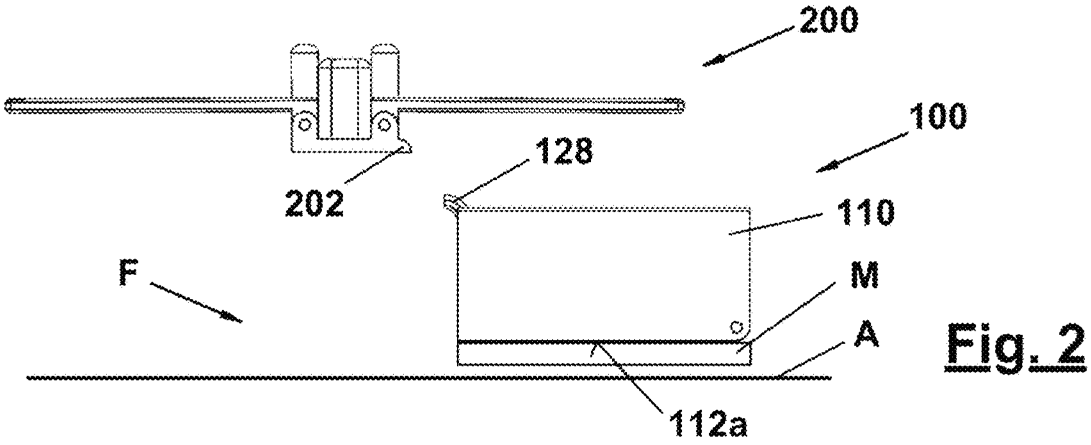
Figure 3:
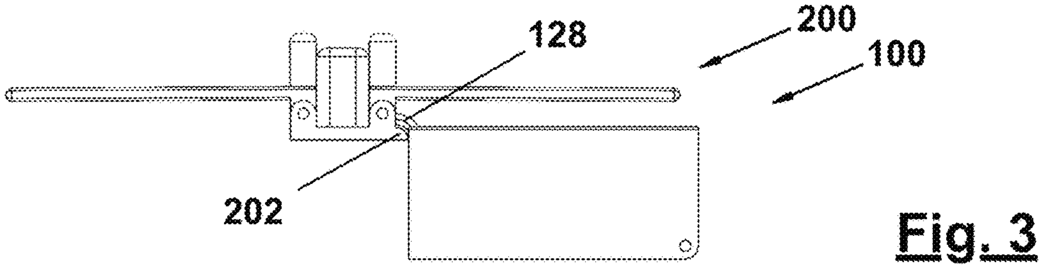

In order to unload the objects O vertically, it must be possible to transfer the tilting unit 120 from its horizontal tilting position as shown in FIGS. 2 and 3 to its vertical tilting position as shown in FIG. 5. For this purpose an engagement element 128, more precisely one engagement element each, is arranged on the tilting unit 120, more precisely on the free ends of the retaining struts 126*a*, which is designed and intended to engage with a counter-engagement element 202 of a base plate 204 of the auxiliary device 200.

Before explaining further, it should be noted that, although not shown in the figures, the auxiliary device 200 can be moved by means of a displacing apparatus, for example a robot arm.

With the receiving device 100 in a predefined unloading position on the working surface A according to FIG. 2, the auxiliary device 200 can be moved towards the receiving device 100 in such a way that the counter-engagement element 202 of the auxiliary device 200 engages with the engagement element 128 of the receiving device 100 (situation according to FIG. 3).

The auxiliary device 200 is then moved through a circular arc C about the tilting axis A of the tilting unit 120, whereby the tilting unit 120 is lifted out of the base unit 110 of the receiving device 100 and tilted about the tilting axis A. Since both the engagement element 128 and the counter-engagement element 202 abut against each other with circular cylindrical surfaces, they slide smoothly against each other.

As shown in the figures, the auxiliary device 200 has a first abutting unit 210 which is hinged to the base plate 204 of the auxiliary device so as to pivot about a substantially horizontal pivot axis S1. To prevent the objects O from falling out of the receiving device 100 when the tilting unit 120 is tilted, the first abutting unit 210 can be pivoted in such a way that it abuts against the uppermost object O (see FIGS. 1 and 4) and thereby secures it in the receiving device 100.

Furthermore, the auxiliary device 200 has a second abutting unit 220 which is hinged to the base plate 204 of the auxiliary device so as to pivot about a substantially horizontal pivot axis S2. This second abutting unit has two abutting tines 222 (see FIG. 1), which are designed and intended to enter between the support struts 122*d* and retaining struts 126*a* and move between them.

Once the tilting unit 120 has reached the vertical position shown in FIG. 5, the second abutting unit 220 can also be pivoted in such a way that it rests against the lowest object O (see FIG. 4).

If the two abutting units 210, 220 exert a sufficiently strong lateral pressure on the objects O, they can grip the objects O, remove them from the receiving device 100 and transfer them to a further device (not shown), for example a packaging device.

To return the tilting unit 120 to the horizontal tilting position in a simple manner, the tilting hinge 102 can, for example, be equipped with a return spring (not shown), which initiates the return to the horizontal tilting position as soon as the engagement element 128 has been disengaged from the counter-engagement element 202.

The invention claimed is:

1. A receiving device for transporting at least one object not belonging to the receiving device, the receiving device comprising:

a base unit with a floor portion, an underside of the floor portion configured for attachment to a mover of a conveying device, wherein the mover and the conveying devices are not part of the receiving device;

at least two wall portions which project from at least two side edges of the floor portion, wherein the at least two wall portions are opposite one another with respect to a side of the floor portion facing away from the underside of the floor portion; and a tilting unit which is hinged to the base unit by means of a tilting hinge so as to be tiltable about a tilting axis between a horizontal tilting position and a vertical tilting position, the tilting axis extending substantially orthogonally to the at least two wall portions of the base unit, wherein the tilting unit comprises:

i) a support portion which, in the horizontal tilting position, extends substantially parallel to the floor portion of the base unit, ii) at least two retaining portions which, regardless of a respective tilting position, extend substantially orthogonally to the at least two wall portions of the base unit, and iii) at least one aperture through which an abutting unit of an auxiliary device is configured to move, wherein the abutting unit is configured to abut at least one object received in the receiving device.

2. The receiving device according to claim 1, wherein an engagement element is provided at a free end of a first one of the at least two retaining portions which is arranged at a distance from the tilting axis.

3. The receiving device according to claim 1, wherein the at least one aperture of the tilting unit i) passes from a free end of a first one of the at least two retaining portions which is arranged at a distance from the tilting axis and ii) extends into the support portion.

4. The receiving device according to claim 3, wherein the at least one aperture extends into the support portion to an end of the support portion that is adjacent to the tilting axis.

5. The receiving device according to claim 1, wherein a return spring is assigned to the tilting hinge.

6. The receiving device according to claim 5, wherein the return spring is a torsion spring.

7. The receiving device according to claim 1, wherein a pneumatic unit or an electric motor-driven power unit is assigned to the tilting hinge.

8. The receiving device according to claim 1, wherein the floor portion of the base unit has at least one support rib at a point corresponding to the at least one aperture of the tilting unit, wherein the at least one support rib substantially fills the at least one aperture when the tilting unit is in the horizontal tilting position.

9. The receiving device according to claim 1, further comprising the auxiliary device.

10. The receiving device according to claim 1, wherein:

wherein an engagement element is provided at a free end of a first one of the at least two retaining portions which is arranged at a distance from the tilting axis, wherein the auxiliary device comprises a counter-engagement element configured to engage with the engagement element.

11. The receiving device according to claim 1, wherein the auxiliary device comprises the abutting unit and an additional abutting unit, wherein the additional abutting unit is hinged to the auxiliary device so as to pivot about a first pivot axis, wherein the additional abutting unit is configured to abut against the at least one object received in the receiving device.

12. The receiving device according to claim 1, wherein the auxiliary device further comprises the abutting unit, wherein the abutting unit is hinged to the auxiliary device so as to pivot about a second pivot axis.

13. The receiving device according to claim 11, wherein the additional abutting unit and the abutting unit are configured to grip the at least one object received in the receiving device.

* * * * *